US006347071B1

(12) United States Patent
Cupo et al.

(10) Patent No.: US 6,347,071 B1
(45) Date of Patent: Feb. 12, 2002

(54) TIME DIVISION MULTIPLEXED TRANSMISSION OF OFDM SYMBOLS

(75) Inventors: Robert Louis Cupo, Eatontown; Mohsen Sarraf, Rumson; Mojtaba Shariat, Matawan; Mohammad Hossein Zarrabizadeh, Woodbridge, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/170,057

(22) Filed: Oct. 13, 1998

(51) Int. Cl.[7] ................................................. H04J 11/00
(52) U.S. Cl. ....................................... 370/203; 370/537
(58) Field of Search ........................... 370/203, 204–206, 370/208–209, 480, 532, 537, 540

(56) References Cited

U.S. PATENT DOCUMENTS

| 5,805,485 | A | * | 9/1998 | Ito et al. ...................... 708/406 |
| 5,808,925 | A | * | 9/1998 | Ito et al. ...................... 708/406 |
| 5,822,323 | A | * | 10/1998 | Kaneko et al. .............. 370/480 |
| 5,963,557 | A | * | 10/1999 | Eng ............................ 370/432 |
| 6,230,022 | B1 | * | 5/2001 | Sakoda et al. ............... 455/522 |
| 6,275,990 | B1 | * | 8/2001 | Dapper et al. ............... 725/106 |
| 6,279,158 | B1 | * | 8/2001 | Geile et al. .................. 725/126 |
| 6,282,683 | B1 | * | 8/2001 | Dapper et al. ............... 714/746 |

OTHER PUBLICATIONS

David C. Hartup, Daniel M. Alley, & Don R. Goldstein, "AM Hybrid IBOC DAB System", USA Digital Radio, 1997, pp. 1–8.

* cited by examiner

Primary Examiner—David R. Vincent
(74) Attorney, Agent, or Firm—William H. Bollman (57) ABSTRACT

An orthogonal frequency division multiplexing (OFDM) technique which is time division multiplexed to reduce the overall effect on individual services from conditions such as selective fading. In accordance with the principles of the present invention, all available subcarriers in a channel are assigned to fewer than all of the requesting services, e.g., to just one particular service for a period of time. The period of time is preferably independent of the length of a conventional data frame. Thereafter, a second service is assigned access to the use of all available subcarriers for a period of time corresponding to its required bandwidth, and so on until all requesting services are allotted a portion of time for access to all available subcarriers. Any one service may utilize any number of the available subcarriers in a particular superframe containing one cycle of transmissions for all services.

7 Claims, 9 Drawing Sheets

TIME DIVISION MULTIPLEXED TRANSMISSION OF OFDM SYMBOLS

BACKGROUND OF THE INVENTION

1. Field of the Invention

This invention relates generally to any system using a robust orthogonal frequency division multiplexing (OFDM) transmission scheme which is capable of reliably carrying a plurality of services or programs (referred to collectively herein as services) within each channel of allocated bandwidth even in a selective channel fading environment.

2. Background of Related Art

Orthogonal frequency division multiplexing (OFDM) is a conventional technique for transmitting data symbols using mutually independent and separated radio frequency (RF) subcarriers. OFDM has several desirable properties, e.g., it simplifies or even eliminates equalization problems considerably, has graceful performance degradation, and because of the absence of equalization, can be lower in complexity.

In a traditional multi-service OFDM system respective groups of available subcarriers in a given channel are assigned to each supported service according to the service's bandwidth needs. Therefore, OFDM symbols typically comprise two or more services each.

Figure 4:
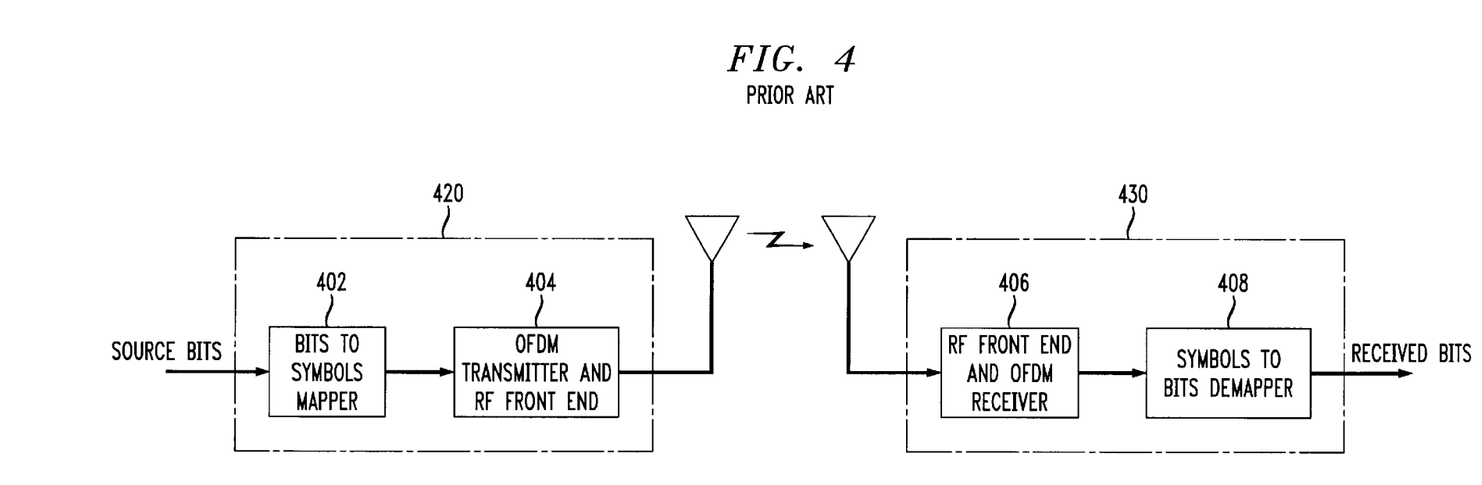
FIG. 4 shows a transmitting portion and receiving portion, respectively, of a conventional OFDM transmission system.

FIG. 4 shows a block diagram of a conventional OFDM transmission system.

In particular, in the transmitting portion 420 of the OFDM transmission system shown in FIG. 4, a data source containing source bits from all the different services or programs (e.g., three different digital audio broadcast (DAB) services or programs) is input to a bits to symbol mapper 402. The bits to symbol mapper 402 maps the data bits for current data output from respective DAB services or programs into a contiguous symbol stream. The contiguous symbol stream is input to an OFDM transmitter and radio frequency (RF) transmitter front end 404, which transmits the contiguous symbol stream using the assigned portion of the available OFDM subcarrier frequencies.

At the receiving portion 430 of the OFDM transmission system shown in FIG. 4, an RF receiver front end and OFDM receiver 406 receives the contiguous symbol stream containing the information for the number of different DAB services or programs (e.g., for three different DAB services or programs). A symbols to bits demapper 408 converts the contiguous symbol stream back into a data bit stream containing data for all of the different DAB services or programs.

Figure 5:
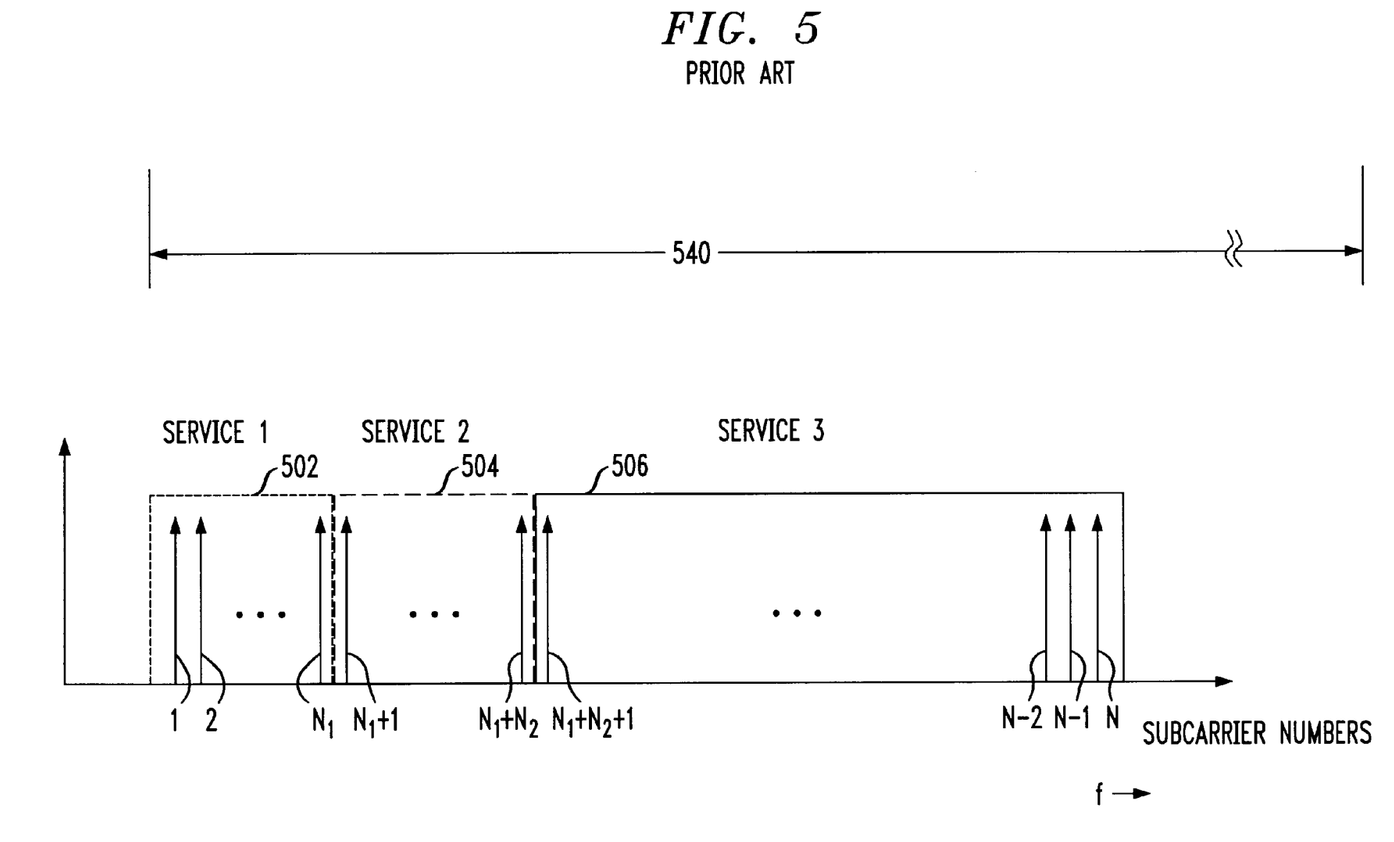
FIG. 5 shows a general assignment of available subcarrier frequencies for use by three services in a conventional OFDM transmission.

FIG. 5 shows a conventional frequency distribution of OFDM subcarriers 1 to N for use by the different DAB services or programs, e.g., three different DAB services or programs 502–506. The OFDM subcarriers 1 to N represent in this example all of the available subcarriers used in the transmission between the transmitting portion 420 and receiving portion 430 of a conventional OFDM transmission system, e.g., as shown in FIG. 4.

When a number of different DAB services or programs 502–506, e.g., three, are simultaneously transmitted, the available OFDM subcarriers 1 to N are conventionally distributed in frequency among the plurality of services 502–506. For instance, the available OFDM subcarriers 1 to N are typically assigned in fixed, contiguous groups with respect to frequency between the three different DAB services or programs 502–506 as depicted in FIG. 5. The number of subcarriers assigned to each DAB service or program is application specific, and typically depends upon the information capacity required by each DAB service or program.

Thus, in the disclosed example, a first DAB service or program 502 is assigned the first contiguous group $N_1$ of all available OFDM subcarriers (e.g., 1 to $N_1$), a second DAB service 504 is assigned the next contiguous group $N_2$ of the remaining available OFDM subcarriers (e.g., $N_1+1$ to $N_1+N_2$), and the third DAB service or program 506 is assigned the last contiguous group $N_3$ of all available OFDM subcarriers (e.g., $N_1+N_2+1$ to N).

However, a transmission channel 540 (e.g., an FM station) containing the OFDM subcarriers 1 to N of the different DAB services or programs 502–506 may be subject to selective fading affecting some of the OFDM subcarriers but not others. This is particularly true in a fixed or slow speed mobile environment. In such a case, a large number of the assigned subcarriers of one DAB service or program may be detrimentally affected while at the same time all or most of the assigned subcarriers of other DAB services or programs may be unaffected.

Figure 6:
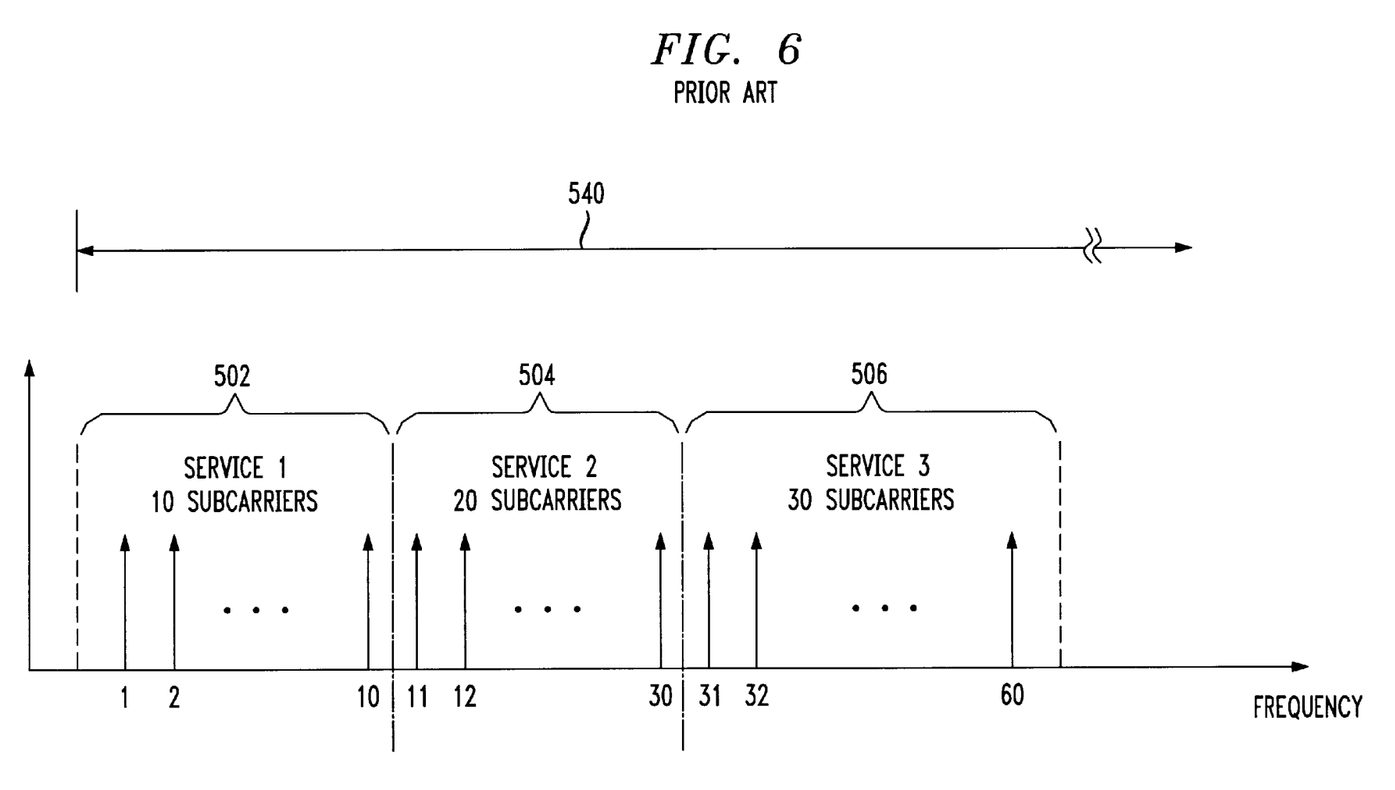
FIG. 6 shows a specific conventional assignment of ten, twenty and thirty available subcarriers for use by three services, respectively.
Figure 7A:
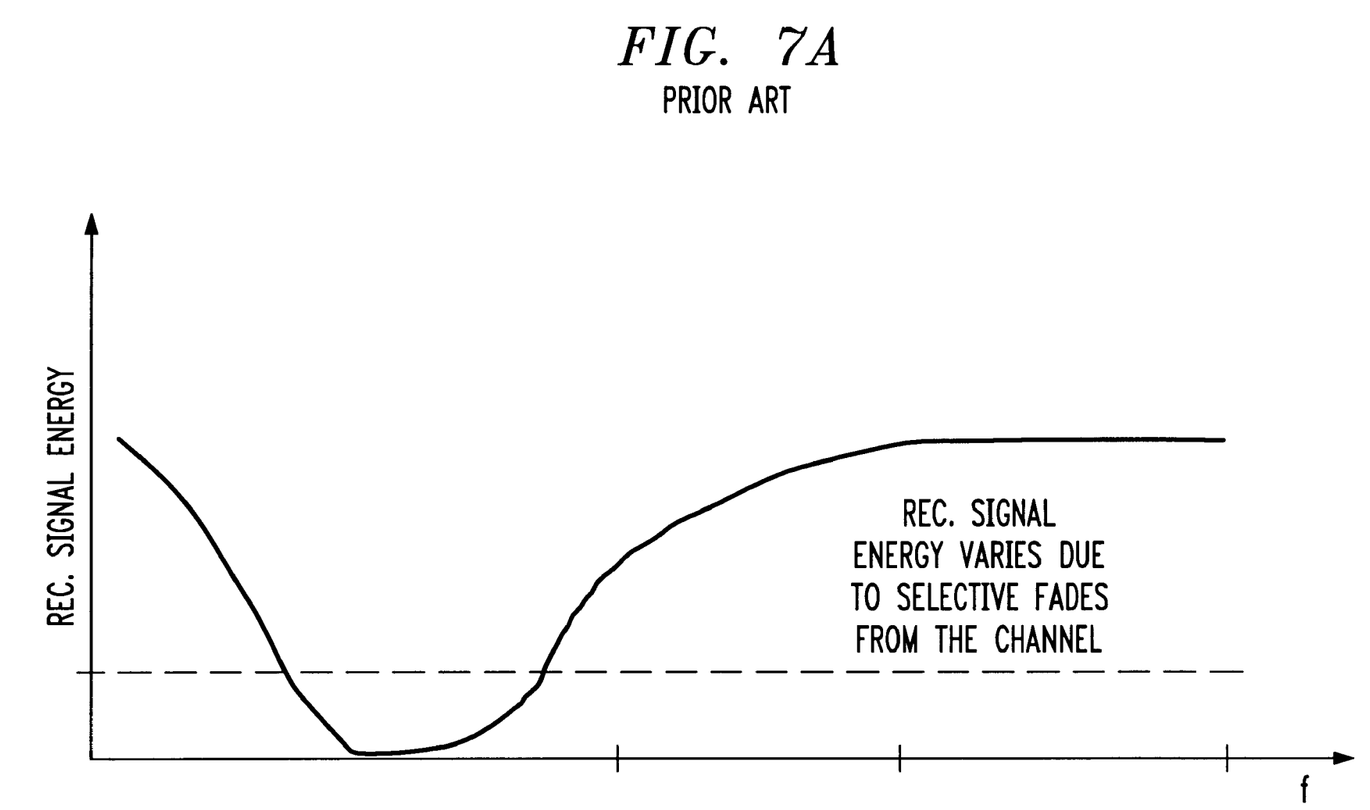
FIGS. 7A and 7B show a relevant portion of a possible fading scenario in the conventional example shown in FIGS. 5 and 6 in which five of the subcarriers of the first service are hit by a frequency selective fade.
Figure 7B:
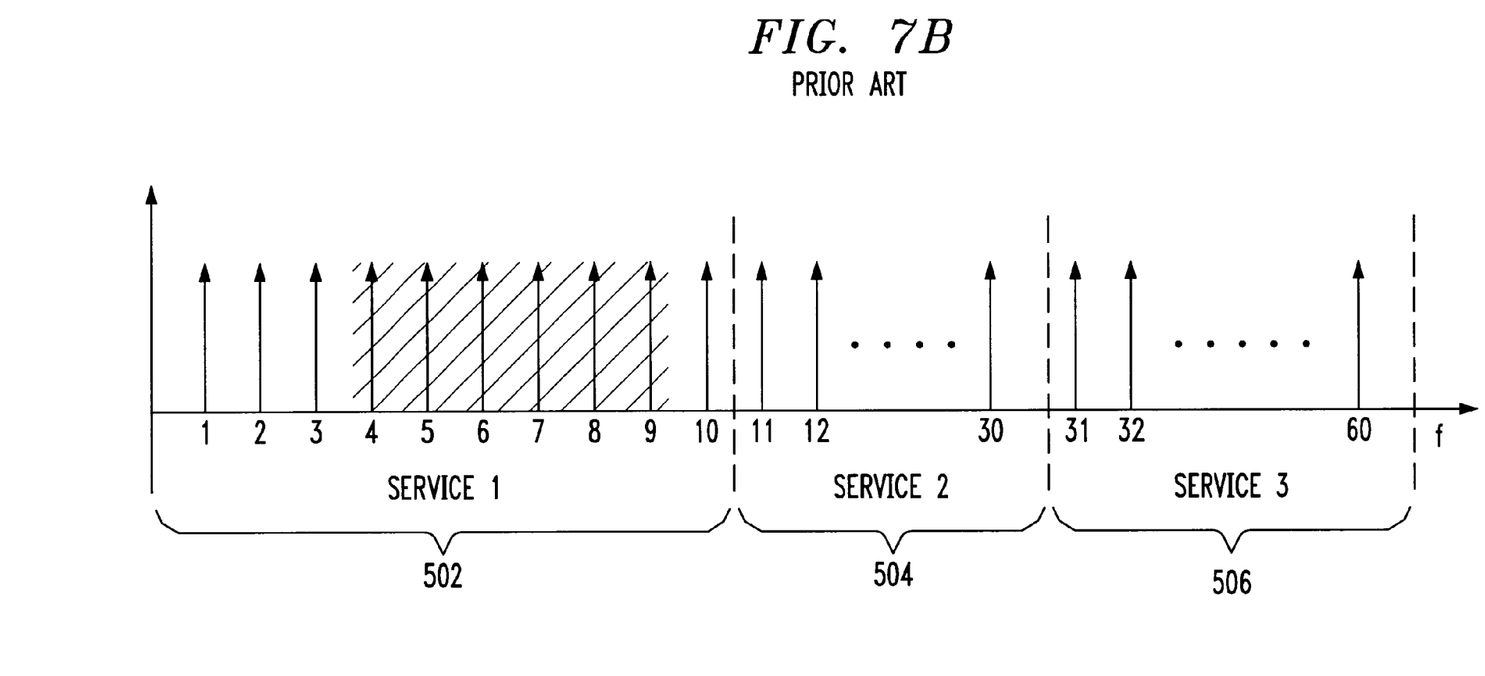

This example is further illustrated in FIGS. 6 and 7 demonstrating the effect of selective fading on some but not all OFDM subcarriers.

In particular, in FIG. 6, at least sixty subcarrier frequencies 1 to 60 are assumed to be available in each data frame in the frequency domain. In the disclosed example, the first service 502 has the first ten (10) OFDM subcarrier frequencies 1 to 10 assigned thereto, the second service 504 has the next twenty (20) subcarriers 11 to 30 assigned thereto, and the third service 506 has the last thirty (30) subcarriers 31 to 60 assigned thereto.

Each of the different DAB services or programs 502–506 may conventionally have its own interleaver and/or Forward Error Correction (FEC) scheme to improve the quality of the transmission channel 540.

FIGS. 7A and 7B show a relevant portion of a possible fading scenario in the example shown in FIG. 6 in which five of the subcarriers of the first service 502 are hit by a frequency selective fade. In such a case, the fourth through ninth subcarriers 4 to 9 assigned to the first service 502 are shown as detrimentally affected by the selective frequency fade and likely lost. This loss of ½ (i.e., five (5) out of the ten (10) subcarriers or 50%) of the total subcarriers assigned to the first service 502 may be beyond the error recovery capability of the FEC scheme used for that particular service. In this example, however, the other two services 504 and 506 do not suffer from the frequency selective fades. Thus, while the symbols transmitted by the first service 502 during that use or data frame of the available subcarriers would likely be lost, the symbols transmitted by the other services 504 and 506 would be unaffected.

While the interleaver and/or FEC function of the various services or programs may be suitable to maintain reliable communications in the transmission channel 540, e.g., an FM station in the absence of selective fading, the interleaver and FEC function of the one service or program may not be adequate to fully overcome the deterioration of the data communication due to channel fades, particularly when they affect a large percentage of the assigned subcarrier frequencies for just one service or a small percentage of a large number of requesting services for the channel. Thus, the impact of channel fades may affect some services more than other services.

Accordingly, in a frequency selective environment, one or more of the services may be rendered useless at the receiver due to channel impairments. There is thus a need to improve the reliability of all or substantially all services or programs transmitted using OFDM modulation techniques within a transmission channel, e.g., within an FM channel.

SUMMARY OF THE INVENTION

In accordance with the principles of the present invention, a time division multiplexed orthogonal frequency division multiplexed transmitter comprises a bits to symbols mapper, a time division multiplex symbol rearranger in communication with the bits to symbols mapper, and an OFDM transmitter and radio frequency front end in communication with the time division multiplex symbol rearranger.

In another aspect of the present invention, a time division multiplexed orthogonal frequency division multiplexed receiver comprises a radio frequency front end and OFDM receiver, a time division multiplex symbol arranger in communication with the radio frequency front end and OFDM receiver, and a symbols to bits demapper in communication with the time division multiplex symbol arranger.

A method of transmitting symbols relating to a plurality of services in accordance with the principles of the present invention comprises assigning respective periods of time for transmission to each of a plurality of services. At least one symbol is firstly transmitted for a first one of the plurality of services using substantially all available subcarrier frequencies in an orthogonal frequency division multiplexed transmission system for a first period of time assigned to the first one of the plurality of services.

A method of transmitting symbols relating to a plurality of services in accordance with another aspect of the present invention comprises assigning respective periods of time for transmission to each of a plurality of services, and transmitting data from less than all of the plurality of services in a data frame corresponding to a use of all of a plurality of available subcarrier frequencies.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Instead of assigning respective portions of the available subcarriers in the frequency domain only to each requesting service as in the conventional techniques, the present invention provides a time division multiplexing (TDM) approach to dividing up the bandwidth of a channel among a plurality of requesting services. In accordance with the principles of the present invention, all available subcarriers for use by an orthogonal frequency division multiplex (OFDM) symbol are assigned to one particular service for a period of time, and then all available subcarriers are assigned for use by a second service for a second period of time, and then all available subcarriers are assigned for use by a third service for a third period of time, etc., until all services have been serviced. Then, all available subcarriers are again assigned to the first service, and the process repeats.

The amount of time during which each service has all available subcarriers assigned thereto relates to the respective bandwidth requirements. For instance, if all services require equal bandwidth, then all services may have equal time allotments of all of the available subcarriers. In this case, one symbol may be transmitted by each service using all necessary subcarriers for a period of time, and so one for all services. On the other hand, if one service requires, e.g., twice as much bandwidth as the other services, then that service preferably has use of all necessary ones of the subcarriers for twice as long as the other services.

Thus, time allotments of all available subcarriers to each service, one (or more) at a time, provides a time division multiplexing feature above the orthogonal frequency division multiplexing of the OFDM transmission system to provide TDM OFDM in accordance with the principles of the present invention.

The TDM transmissions are preferably frequency frame independent. Thus, a single service may have access to all available subcarriers at any one time even though there are many more requesting services. After the first service utilizes all available subcarriers for as many symbols as are required per an established bandwidth for that service, the next service will then have access to all available subcarriers for as many symbols as are required by its bandwidth, and so on.

Any one service may utilize any number of the available subcarriers for any period of time. Thus, e.g., a service may use just one or two subcarriers to transmit only one symbol (low bandwidth requirements) or may use all available subcarriers a plurality of times to transmit a large number of symbols (large bandwidth requirements). Thus, different services may take respectively different numbers of subcarriers for different periods of time to transmit their respective data, according to their bandwidth needs.

A full 'round' of each requesting services' timed multiplexed transmission over the relevant channel is referred to herein as a superframe. Superframes containing TDM OFDM symbols from a plurality of services in accordance with the principles of the present invention may be variable in length. The length of the superframe depends upon the length of one cycle of transmissions from all requesting services.

Furthermore, as new services are added or deleted, the length of the superframe preferably changes in length accordingly. An example superframe 800 is shown in FIG. 1.

Figure 1:
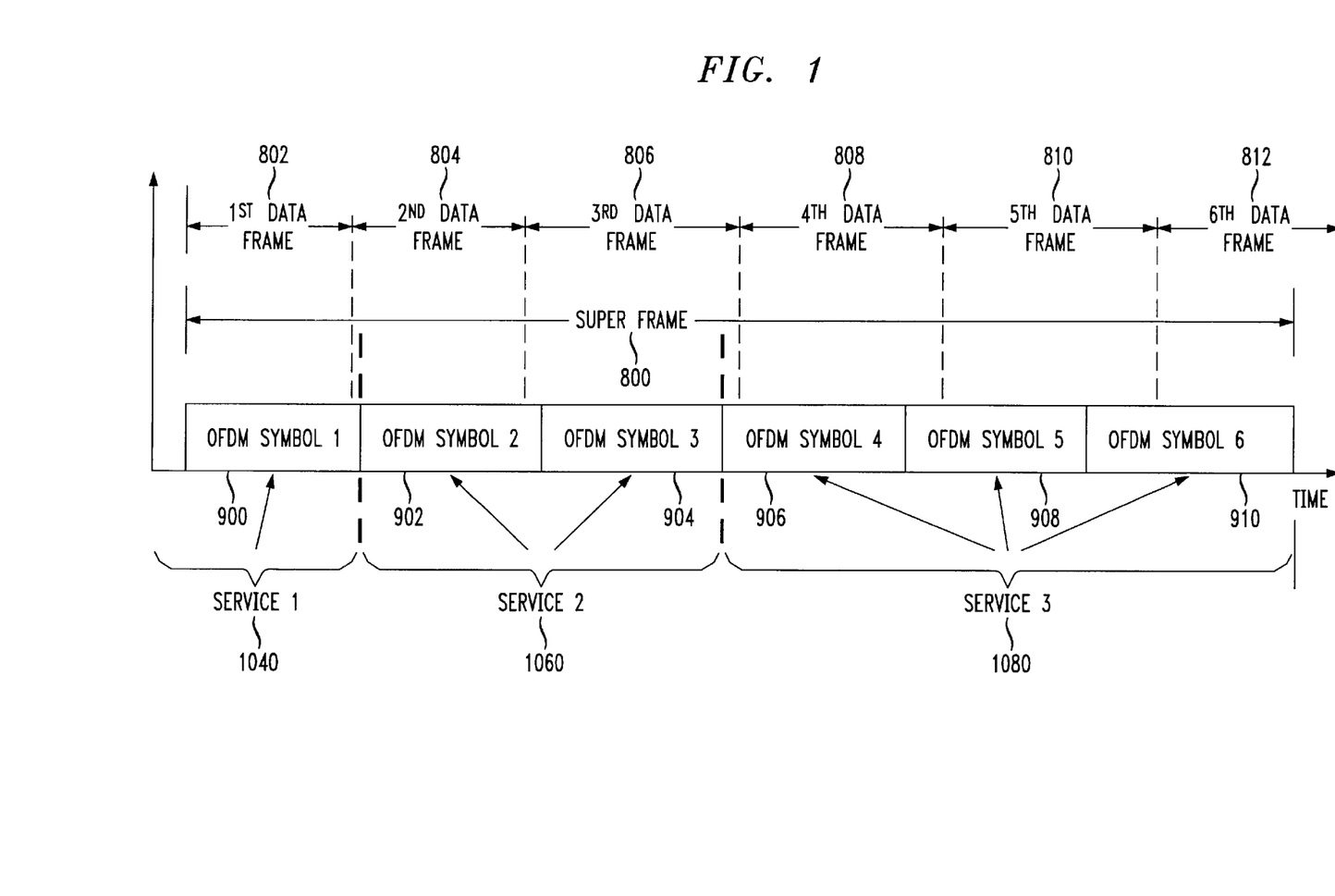
FIG. 1 shows a time division multiplexed (TDM) orthogonal frequency division multiplexing (OFDM) superframe in an exemplary OFDM transmission in accordance with the principles of the present invention.

FIG. 1 shows a plurality of full data frames 802–810 each corresponding to one use of all available subcarriers, and a portion of a last data frame 812 comprising a single superframe 800. In FIG. 1, although it might appear to be more practical and simpler for implementation purposes for each service to take up a whole integer number of frames, this may be wasteful particularly if the frame size is not proportional to the exact bandwidth requirements of the requesting services. Thus, the present invention contemplates and relates equally to a non-frame length based TDM OFDM system wherein the TDM boundaries or 'slots'0 for each service in each superframe 800 do not necessarily lie on data frame boundaries defined by single uses of all available subcarriers, e.g., as depicted by the data frames in the frequency domain 802–812 shown in FIG. 1.

Based on particular application requirements, a first service 1040 is assigned all available subcarriers to transmit a first OFDM symbol (or symbols) 900. Note that the example of FIG. 1 shows that the OFDM symbols(s) 900 of the first service 1040 require the time otherwise required by a first conventional data frame 802 and a small portion of a second conventional data frame 804. The present invention is applicable to the use of less than the time corresponding to a single conventional data frame for the transmission of symbols of a single service of more time than a single conventional data frame, or exactly the same amount of time as a conventional data frame.

After the first service 1040 has had access to all subcarriers for its allotted TDM time necessary to transmit the number of symbols to achieve the desired throughput, the second service 1060 is then assigned access to all available subcarriers for transmission of, e.g., OFDM symbols 902 and 904. Note that in the disclosed example the second service 1060 is assigned most of the time corresponding to a second conventional data frame 804 and most of the time for a third conventional data frame 806, but not the full time for either the second or third conventional data frames 804, 806.

A third service 1080 is assigned access as necessary to all available subcarriers for a portion of time reflective of the required bandwidth for the third service 1080. In the disclosed example, the third service 1080 requires a larger bandwidth than the second service 1060, which requires a larger bandwidth than the first service 1040. The transmitted OFDM symbols 906–910 of the third service 1080 require, in the disclosed example, all of the time corresponding to the length of a conventional fourth data frame 808, all of the time corresponding to the length of a conventional fifth data frame 810, and a majority of the time corresponding to the length of a conventional sixth data frame 812.

In accordance with the principles of the present invention, services need not transmit in every superframe. For instance, depending in particular on the bandwidth requirements of the specific service, the services may utilize a variable number of the available subcarriers based on a variable number of OFDM symbols on a superframe to superframe basis. Moreover, this variation in the number of the available subcarriers used by each service on a superframe to superframe basis may vary, e.g., on a periodic basis or on a random basis.

Figure 2A:
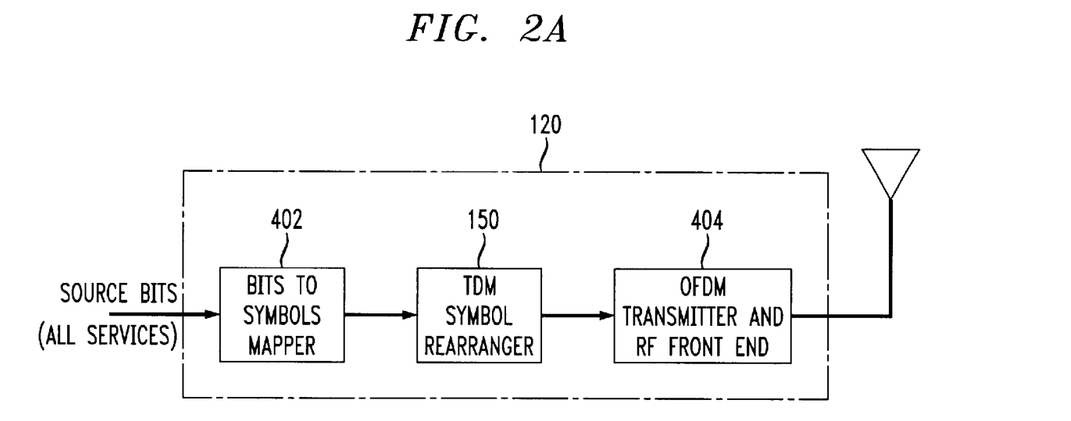
FIGS. 2A and 2B show a transmitting portion and receiving portion, respectively, of a TDM OFDM transmission system in accordance with the principles of the present invention.
Figure 2B:
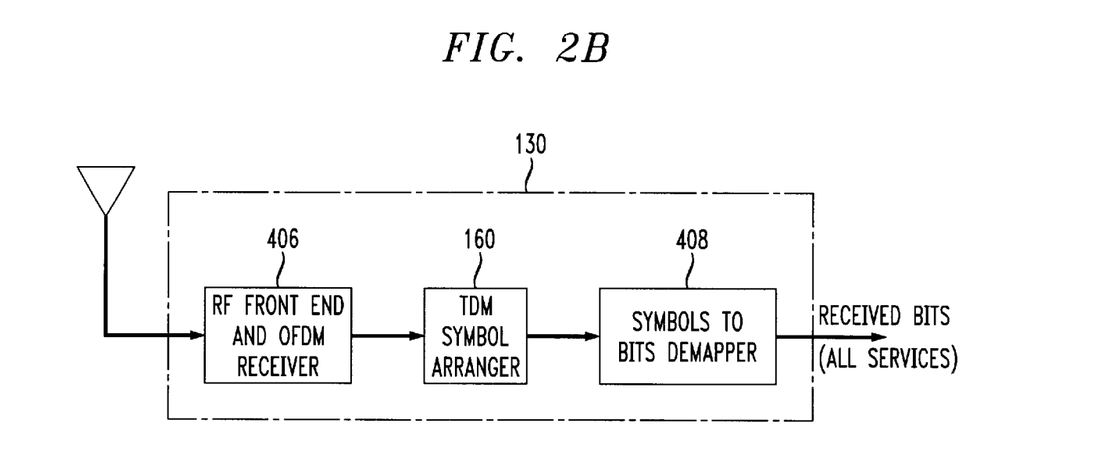

FIGS. 2A and 2B show exemplary TDM OFDM transmission and receiver systems, 120, 130, respectively, in accordance with the principles of the present invention.

In particular, the transmission system 120 includes a bits to symbols mapper 402 and an OFDM transmitter and radio frequency (RF) front end 404 which are otherwise as in conventional systems. However, between the bits to symbols mapper 402 and the OFDM transmitter and RF front end 404 the TDM OFDM transmission system 120 includes a TDM symbol rearranger 150.

The TDM symbol rearranger 150 receives a serial bit stream containing data relating to a plurality of services and rearranges the bit data to achieve TDM timing, e.g., as shown in FIG. 1.

For instance, the TDM symbol rearranger 150 rearranges the data such that the data in the bit stream from the bits to symbols mapper 402 and corresponding to the first service is presented first to the OFDM transmitter and RF front end 404 corresponding to the length of time that all subcarriers are assigned to the first service. Thereafter, the data corresponding to the second service is presented to the OFDM transmitter and RF front end 404, and then the data corresponding to the third service is presented to the OFDM transmitter and RF front end 404.

A buffer may be included between the bits to symbols mapper 402 and the TDM symbol rearranger 150 as necessary.

The TDM OFDM receiver system 130 shown in FIG. 2B contains opposing modules as to the TDM OFDM transmission system 120 shown in FIG. 2A. For instance, the TDM OFDM receiver system 130 includes an RF front end and OFDM receiver 406, a TDM symbol arranger 160 (and buffer as necessary), and a symbols to bits demapper 408. The individual RF front end and OFDM receiver 406 and the symbols to bits demapper 408 components correspond substantially to those elements found in a conventional system, e.g., as shown in FIG. 4. However, the inventive system performs TDM multiplexing in the TDM symbol arranger 160.

Figure 3A:
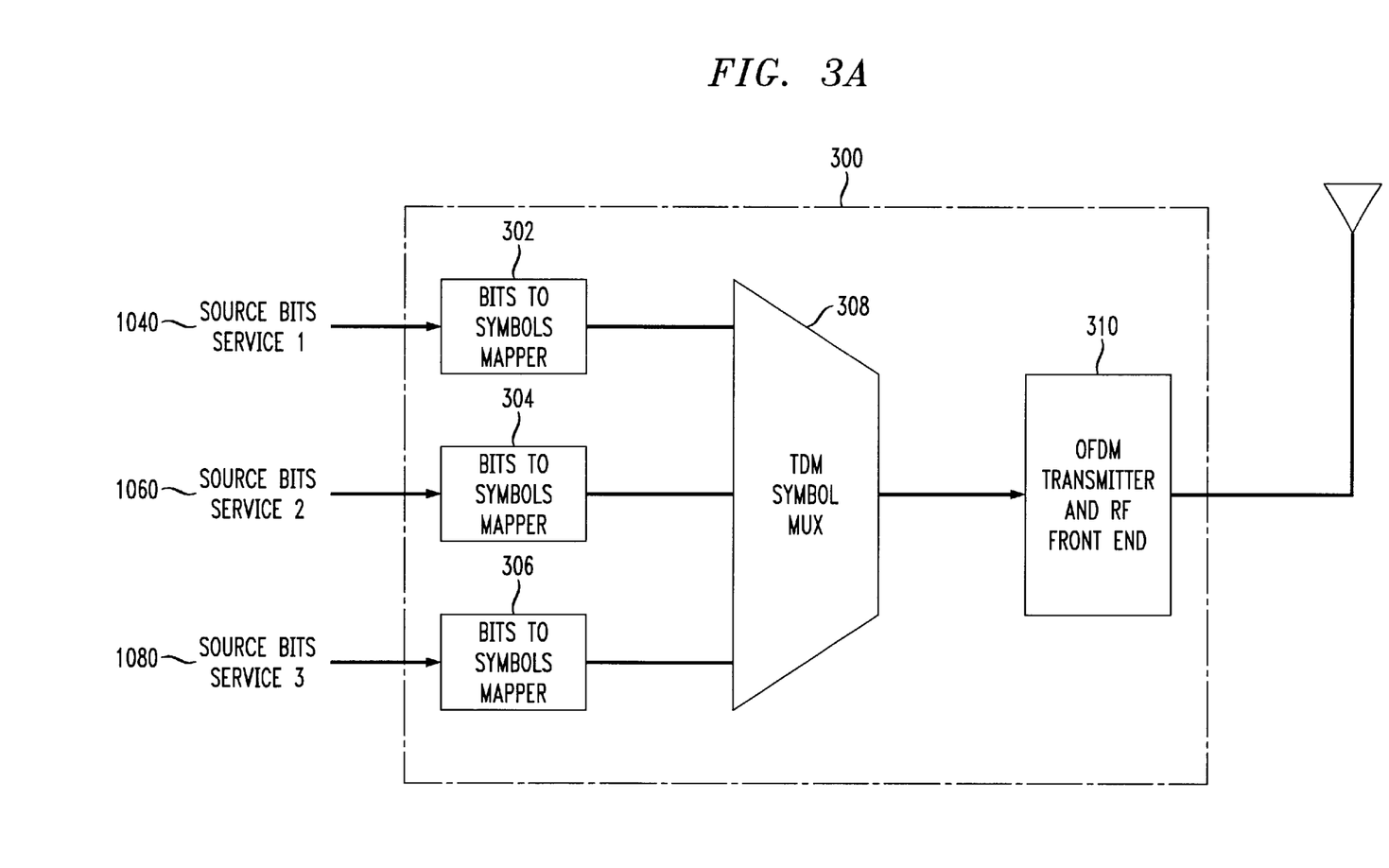
FIGS. 3A and 3B show an alternative embodiment of a TDM OFDM transmission system in accordance with the principles of the present invention.
Figure 3B:
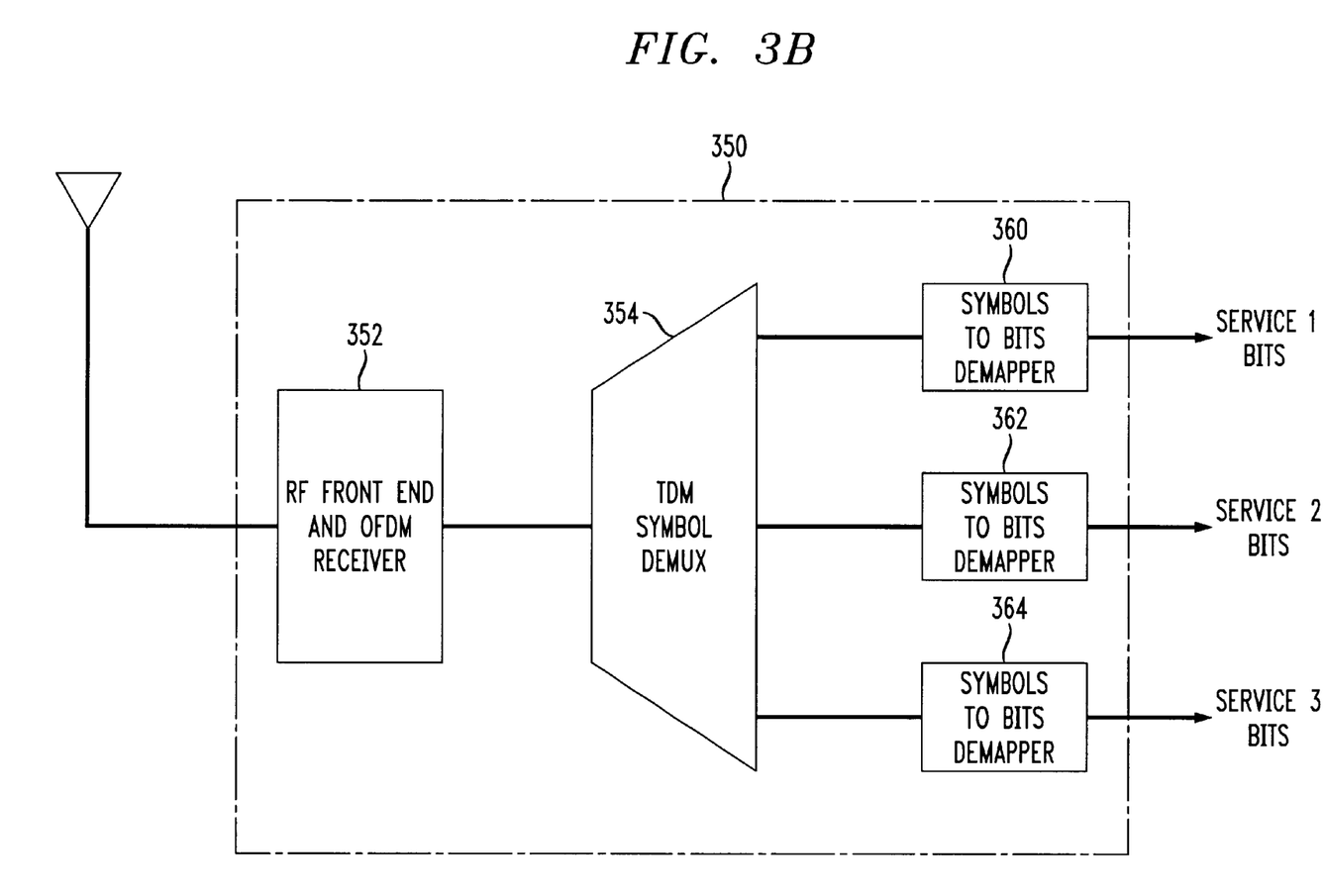

FIGS. 3A and 3B show an alternative embodiment of a TDM OFDM transmission and receiver system in accordance with the principles of the present invention wherein instead of a serial stream of bits including data corresponding to a plurality of services, parallel access to the data regarding each of the plurality of services 1040–1080 is provided. In such a case, rather than rearranging a serial stream of bits, a TDM multiplexer 308 (or TDM demultiplexer 354 in FIG. 3B) merely time multiplexes (or demultiplexes) each of the data streams 1040–1080 for presentation to the OFDM transmitter and RF front end 310 (in FIG. 3A) and from the RF front end and OFDM receiver 352 (in FIG. 3B). The multiplexer 308 and demultiplexer 354 are operated in correspondence with the respective times that all subcarriers are assigned for access by the respective service.

In accordance with the principles of the present invention, use of all available OFDM subcarriers by each service lowers the relative percentage of subcarriers affected by environmental conditions, e.g., by selective fading, and thus increases the chances that an interleaver and/or FEC scheme relevant to that particular service will be capable of recovering from the lower percentage loss for that sequence of symbols. To this end, it is preferably that each requesting service use as many subcarriers as possible to reduce the likelihood of a high percentage loss of data due to selective fading.

While the invention has been described with reference to the exemplary embodiments thereof, those skilled in the art will be able to make various modifications to the described embodiments of the invention without departing from the true spirit and scope of the invention.

What is claimed is:

1. A time division multiplexed orthogonal frequency division multiplexed transmitter, comprising:

a bits to symbols mapper;

a time division multiplex symbol rearranger in communication with said bits to symbols mapper; and an OFDM transmitter and radio frequency front end in communication with said time division multiplex symbol rearranger.

2. The time division multiplexed orthogonal frequency division multiplexed transmitter according to claim 1, wherein:

said time division multiplex symbol rearranger is adapted to rearrange an input data stream to provide output symbols relating to one requesting service at a time.

3. The time division multiplexed orthogonal frequency division multiplexed transmitter according to claim 1, wherein:

said time division multiplex symbol rearranger includes a multiplexer to multiplex any of a plurality of symbol streams to said OFDM transmitter and RF front end.

4. The time division multiplexed orthogonal frequency division multiplexed transmitter according to claim 1, wherein:

said time division multiplex symbol rearranger is adapted to output symbols relating to a single service for transmission by said OFDM transmitter and radio frequency front end using substantially all available subcarrier frequencies relating to a particular channel.

5. A time division multiplexed orthogonal frequency division multiplexed receiver, comprising:

a radio frequency front end and OFDM receiver;

a time division multiplex symbol arranger in communication with said radio frequency front end and OFDM receiver; and a symbols to bits demapper in communication with said time division multiplex symbol arranger.

6. The time division multiplexed orthogonal frequency division multiplexed receiver according to claim 5, wherein:

said time division multiplex symbol arranger is adapted to arrange an input data stream to provide output symbols relating to one requesting service at a time.

7. The time division multiplexed orthogonal frequency division multiplexed receiver according to claim 5, wherein:

said time division multiplex symbol arranger includes a demultiplexer to demultiplex a symbol stream to said symbols to bits demapper.

\* \* \* \* \*